(12) United States Patent
Itoh

(10) Patent No.: US 8,958,082 B2
(45) Date of Patent: Feb. 17, 2015

(54) DOCUMENT CREATION APPARATUS, DOCUMENT CREATION METHOD AND RECORDING MEDIUM

(75) Inventor: Kenji Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 560 days.

(21) Appl. No.: 13/160,571

(22) Filed: Jun. 15, 2011

(65) Prior Publication Data

US 2011/0310421 A1 Dec. 22, 2011

(30) Foreign Application Priority Data

Jun. 17, 2010 (JP) ................................ 2010-138067

(51) Int. Cl.
*G06F 3/12* (2006.01)
*H04N 1/387* (2006.01)
*G06T 5/00* (2006.01)

(52) U.S. Cl.
CPC .................................... *H04N 1/387* (2013.01)
USPC ........................................ 358/1.13; 358/3.26

(58) Field of Classification Search
CPC ................................ H04N 1/387; G06F 15/00
USPC ....................................................... 358/3.26
See application file for complete search history.

(56) References Cited

U.S. PATENT DOCUMENTS

| 6,954,290 B1* | 10/2005 | Braudaway et al. | 358/3.26 |
| 7,430,065 B2* | 9/2008 | Arakai et al. | 358/3.26 |
| 2005/0225805 A1* | 10/2005 | Kato | 358/1.18 |

FOREIGN PATENT DOCUMENTS

| JP | 2005-303740 | | 10/2005 |
| JP | 2008-022159 | | 1/2008 |
| JP | 2008022159 A | * | 1/2008 |

\* cited by examiner

*Primary Examiner* — Ashish K Thomas
*Assistant Examiner* — Neil R McLean
(74) *Attorney, Agent, or Firm* — Renner, Otto, Boisselle & Sklar, LLP

(57) ABSTRACT

The document creation apparatus includes a planned division region data extraction unit that extracts data of a planned division region from document image data for each of all pages of a double-page spread document; a reference data generation unit that generates reference data for the planned division regions based on the extracted data of the planned division regions of all pages; a division determination unit that, if a difference between the reference data and the data of the planned division region is larger than or equal to a preset determination threshold, determines that division is impossible, and if the difference is smaller than the determination threshold, determines that division is possible; and an image division processing unit that, if the determination result is that division is impossible, prints the document image data without dividing the document image data, and if the determination result is that division is possible, divides and prints the document image data.

13 Claims, 12 Drawing Sheets

DOCUMENT CREATION APPARATUS, DOCUMENT CREATION METHOD AND RECORDING MEDIUM

CROSS-REFERENCE TO RELATED APPLICATIONS

This application claims priority under 35 U.S.C. §119(a) on Patent Application No. 2010-138067 filed in Japan on Jun. 17, 2010, the entire contents of which are herein incorporated by reference.

BACKGROUND OF THE INVENTION

1. Field of the Invention

The present invention relates to a document creation apparatus having a function of dividing and copying double-page spread documents, a document creation method and a recording medium.

2. Description of the Related Art

Conventionally, an image forming apparatus has been proposed that, when there is an element arranged straddling right and left pages or top and bottom pages of a double-page spread document such as a book, is capable of printing or saving as image data the element without dividing the element (e.g., see JP 2005-303740A).

In the case where an instruction has been input for separately forming the images on right and left pages or top and bottom pages of the double-page spread document, the image forming apparatus disclosed in JP 2005-303740A determines whether there is an element arranged straddling right and left pages or top and bottom pages. If the determination result is affirmative, the image forming apparatus outputs the document image data without dividing the document image data, and if the determination result is negative, it supplies the document image data to an image dividing unit, generates divided image data representing images obtained by dividing the document image into two portions, namely, right and left portions or top and bottom portions, and outputs the divided image data.

Here, with reference to FIGS. 10A to 10C, the concept of a double-page spread document such as a book will be described.

FIG. 10A is a conceptual diagram of a double-page spread document such as a book, and FIG. 10B is a conceptual diagram of a one-page document.

In the double-page spread document shown in FIG. 10A, separate images are respectively printed on the right and left pages, and a book is formed by folding the document in two at a blank portion at the center thereof.

On the other hand, there are cases in which one page-worth of image as shown in FIG. 10B, for example, is printed straddling the right and left pages of a double-page spread document. In this case, the book is folded in two at a central portion thereof where an image is formed.

That is, some books include both a two-page document as shown in FIG. 10A in which separate images are respectively printed on two pages of a double-page spread, and a one-page document as shown in FIG. 10B in which a single image is printed straddling two pages.

When a double-page spread document such as a book that includes both two-page documents and one-page documents as double-page spreads is copied, it is inevitable that the central portion of the opened pages (namely, the folded portion of the book) cannot be placed in contact with the platen of the image forming apparatus, and thus as shown in FIGS. 10A and 10C, a shadow 150 having a constant width may appear at that portion, namely, the central portion (folded portion) that is to be a division position.

When a double-page spread document which causes the shadow 150 having a constant width in the central portion (folded portion) thereof is divided and copied, with the technique disclosed in JP 2005-303740A, this shadow 150 in the folded portion makes it difficult to divide the document image into elements, and makes it difficult to determine that the document is a double-page spread. On the other hand, in the case where the portion of the shadow 150 having a constant width is determined to be an element, the document image shown in FIG. 10A, which actually should be dividable, may be determined to be not dividable.

That is, although the document image should actually be dividable, the determination result is affirmative (that is, it is determined that there is an element at the division position), and thus a two-page document on which separate images are respectively printed on two pages of the double-page spread may be output as a one-page document without dividing the document image.

SUMMARY OF THE INVENTION

The present invention has been made to solve the conventional issues described above, and it is an object thereof to provide a document creation apparatus, a document creation method and a recording medium that, even with respect to document image data in which the central portion (folded portion) of a double-page spread document that has been read appears as a shadow, are capable of reliably recognizing whether the document is a two-page document in which separate images are respectively printed on two pages of a double-page spread or a one-page document in which an image is printed straddling two pages, and appropriately determining whether division is possible.

In order to solve the above-described issues, a document creation apparatus of the present invention is a document creation apparatus having a function of dividing and copying a double-page spread document, the apparatus including: an image reading unit that reads the double-page spread document and generates document image data respectively for all pages of the double-page spread document; a printing unit that prints the document image data; an extraction unit that extracts data of a planned division region from the document image data for each of the pages generated by the image reading unit, the planned division region including a division position where the document image data is planned to be divided; a generation unit that generates reference data for the planned division regions based on data of the planned division regions of all pages extracted by the extraction unit; a division determination unit that compares the reference data with the data of each planned division region, and if difference data of a difference between the reference data and the data of that planned division region is larger than or equal to a preset determination threshold, determines that division is impossible, and if the difference data is smaller than the preset determination threshold, determines that division is possible; and an image division processing unit that, if a result of the determination by the division determination unit is that division is impossible, prints the document image data with the printing unit without dividing the document image data, and if the result of the determination by the division determination unit is that division is possible, divides the document image data and prints the divided document image data with the printing unit.

With the document creation apparatus of the present invention, a configuration is adopted in which, from document image data for each of the pages of the double-page spread document generated by the image reading unit, data of the planned division region including the division position is extracted, and reference data for the planned division regions is generated based on the extracted data of the planned division regions of all pages. More specifically, a configuration may be adopted in which the generation unit, among the data of the division regions of all the pages extracted by the extraction unit, identifies data of planned division regions that show a similar luminance change in a division direction, and generates the reference data by calculating an average of the identified data of the planned division regions. A configuration may also be adopted in which the generation unit calculates a similarity of a luminance change in the division direction with respect to the data of the planned division regions of all the pages extracted by the extraction unit, identifies data of planned division regions having a similarity that is larger than a preset threshold, and generates the reference data by calculating an average of the identified data sets of the planned division regions.

When a book or the like is copied in a state of double-page spread, a shadow or the like having a constant width may appear in the central portion (folded portion of the book) of the double-page spread document. When all double-page spread pages in the book are copied, the document image data of all of the double-page spread pages that have been read by the image reading unit includes a shadow representing the folded line of the book in the central portion in the division direction.

That is, in the case where the document image data read by the image reading unit is data obtained by copying a double-page spread document, the luminance change in the scanning direction (division direction) of the document image data read with an optical sensor of the image reading unit is such that the peak of the luminance level (maximum value or minimum value of the luminance level) appears in the central portion (folded portion) in the scanning direction.

The present invention focuses on this point, and adopts a configuration in which data of the planned division region including the shadow due to the division position, that is, the folded portion, is extracted from the document image data for each of the all pages of the double-page spread document that has been generated by the image reading unit, and reference data for the planned division regions is generated based on the extracted data of the planned division regions of all pages. In this manner, by generating reference data including the data of the shadow due to the folded portion, the effect of the shadow due to the folded portion can be eliminated when the reference data is compared with the document image data of the double-page spread document. Specifically, since the shadow portion is included in both the reference data and the document image data for all pages of the double-page spread document generated by the image reading unit, the shadow portion can be ignored. Therefore, it becomes possible to precisely determine whether division is possible according to the matching degree between the reference data and the document image data by comparing the reference data and the document image data of other regions. Accordingly, even with respect to the document image data of a double-page spread document such as a book that includes both a two-page document for a double-page spread (document in which separate images are printed respectively on the right and left pages) and a one-page document for a double-page spread (document in which an image is printed straddling the right and left pages), it becomes possible that the two-page document for a double-page spread is reliably divided and printed, and the one-page document for a double-page spread is printed without dividing.

As described above, with the present invention, when a printed material that includes as double-page spreads both a two-page document for a double-page spread and a one-page document for a double-page spread is subjected to division copying, even if the document image data obtained by reading the double-page spread document includes shadow data due to the folded portion of the printed material, a two-page document for a double-page spread is reliably determined to be a two-page document for a double-page spread, and a one-page document for a double-page spread is reliably determined to be a one-page document for a double-page spread, without being affected by the shadow data. As a result, it is possible to reliably divide and print a two-page document for a double-page spread, and to print a one-page document for a double-page spread without dividing.

Also, with the document creation apparatus of the present invention, a configuration may be adopted in which the division determination unit performs the determination by comparing the reference data and the data of each planned division region for at least two regions within each planned division region of the document image data. More specifically, the at least two regions may be at least two orthogonal direction partitions obtained by partitioning each planned division region of the document image data in a direction orthogonal to a division direction.

In the case where an image of a one-page document for a double-page spread is printed on a double-page spread document, depending on the type, size, form, print position or the like of the image, if determination as to whether division is possible is made based on only one region in the division direction, an erroneous determination may occur. For example, in the case of a one-page document 106 for a double-page spread as shown in FIG. 7, a table 106a straddling the right and left pages is printed in an upper portion of the one-page document 106, and in the central and lower portions thereof, description 106b and 106c or the like are respectively printed on the right and left pages. The double-page spread document 106 should be determined to be a one-page document in order to determine more precisely whether division is possible. When this one-page document 106 for a double-page spread is scanned in the division direction (scanning direction) X in the central portion in a height direction (Y) of the document, for example, the table 106a in an upper portion is not present on the scanning line, and therefore the document is determined to be a two-page document for a double-page spread, which can be divided. In view of this, in the present embodiment, the determination through comparison between the reference data and the data of each planned division region is performed in at least two orthogonal direction partitions in the planned division region of the document image, thereby achieving a configuration for performing determination as to whether division is possible more precisely.

In this case, a configuration may be adopted in which the division determination unit compares the reference data with the data of the planned division region for each orthogonal direction partition, and if the difference data of a difference between the reference data and the data of each planned division region is larger than or equal to the preset determination threshold for at least one of the orthogonal direction partitions, determines that division is impossible. Accordingly, it is possible to reliably determine that the one-page document for a double-page spread as shown in FIG. 7 is a one-page document for a double-page spread.

Also, with the present invention, a configuration may be adopted in which if the division determination unit has determined, as a result of the comparison between the reference data and the data of the planned division region, that the difference data of a difference between the reference data and the data of the planned division region is smaller than the determination threshold, then the division determination unit obtains a shift amount in a division direction between the reference data and the data of the planned division region, and the image division processing unit corrects the division position based on the shift amount obtained by the division determination unit, and divides the document image data. A configuration may be adopted in which the image division processing unit corrects the division position of the document image data based on the shift amount obtained by the division determination unit such that a peak value (a maximum or minimum value of the luminance level) of the reference data matches a peak value data (a maximum or minimum value of the luminance level) of the data of each planned division region. A configuration may be adopted in which the image division processing unit corrects the division position of the document image data based on the shift amount obtained by the division determination unit such that a peak value of a luminance change in the division direction of the reference data matches a peak value of the luminance change in the division direction of the data of each planned division region.

With such a configuration, image shifting or reading errors of the document are corrected if images near the division position have similarity, and thus it is possible to perform division copying at the correct position.

Also, with the document creation apparatus of the present invention, a configuration may be adopted in which the generation unit, after correcting the data of the planned division regions of all the pages extracted by the extraction unit such that peak values of luminance changes in a division direction of the data of the planned division regions match each other, generates the reference data for the planned division regions based on the corrected data of the planned division regions of all the pages.

With such a configuration, it is possible to obtain more precise reference data in which shifting of the shadow due to the folded portion between the pages of the document image data has been corrected, and thus it is possible to determine more precisely whether division is possible.

Also, with the document creation apparatus of the present invention, a configuration may be adopted in which the division determination unit, after correcting the reference data such that a peak value of a luminance change in a division direction of the reference data matches a peak value of a luminance change in the division direction of the data of each planned division region, compares the reference data with the data of each planned division region.

With such a configuration, it is possible to obtain more precise reference data in which shifting of the shadow due to the folded portion between the pages of the document image data has been corrected, and thus it is possible to determine more precisely whether division is possible.

Also, with the document creation apparatus of the present invention, a configuration may be adopted in which the division determination unit calculates an average value of the difference data of the differences between the reference data and the data of each planned division region, and if the calculated average value is larger than or equal to the preset determination threshold, determines that division is impossible, and if the calculated average value is smaller than the preset determination threshold, determines that division is possible.

With such a configuration, an effect of variations in the difference data depending on the position can be eliminated, and thus it is possible to determine more precisely whether division is possible.

Also, a document creation method of the present invention is a document creation method executed in a document creation apparatus that divides and copies a double-page spread document, the method including the steps of reading the double-page spread document and generating document image data respectively for all pages of the double-page spread document; extracting data of a planned division region from the document image data for each of the pages generated in the reading and generating step, the planned division region including a division position where the document image data is planned to be divided; identifying data of planned division regions that show a similar luminance change in a division direction among the data of the planned division regions of all the pages extracted in the extracting step, and generating reference data by calculating an average of the identified data of the planned division regions; comparing the reference data with the data of each planned division region, and if difference data of a difference between the reference data and the data of that planned division region is larger than or equal to a preset determination threshold, determining that division is impossible, and if the difference data is smaller than the preset determination threshold, determining that division is possible; and if a result of the determination in the comparing and determining step is that division is impossible, printing the document image data with a printing unit without dividing the document image data, and if the result of the determination in the comparing and determining step is that division is possible, dividing the document image data and printing the divided document image data with the printing unit.

Also, a computer-readable recording medium in which a document generation program for causing a computer to execute the steps of the above-described document creation method is recorded is also included in the scope of the present invention.

According to the document creation method and the recording medium of the present invention, even in the case where a double-page spread document such as a book includes both the two-page document for a double-page spread and the one-page document for a double-page spread, and the document image data obtained by reading the double-page spread document includes shadow data or the like due to the folded portion of the book, a two-page document for a double-page spread is reliably determined to be a two-page document for a double-page spread, and a one-page document for a double-page spread is reliably determined to be a one-page document for a double-page spread, without being affected by the shadow data. As a result, it is possible to reliably divide and copy a two-page document for a double-page spread, and to print a one-page document for a double-page spread without dividing.

BRIEF DESCRIPTION OF THE DRAWINGS

FIG. 10A is a conceptual diagram of a two-page document for a double-page spread of a book or the like.

DESCRIPTION OF THE PREFERRED EMBODIMENTS

Hereinafter, embodiments of the present invention will be described with reference to the accompanying drawings.

Figure 1:
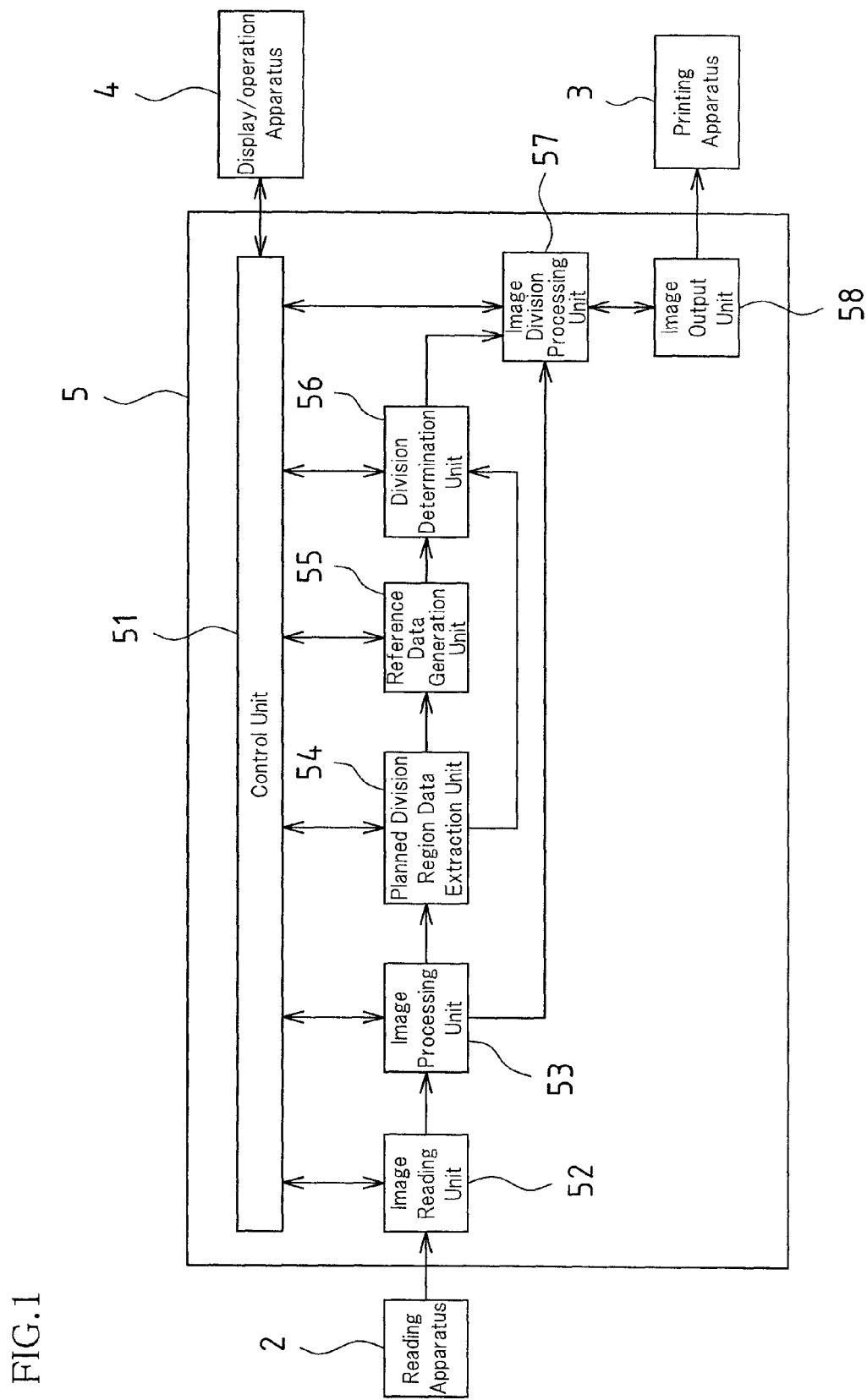
FIG. 1 is a function block diagram schematically illustrating an overall configuration of a document creation apparatus according to an embodiment of the invention.

FIG. 1 is a function block diagram schematically illustrating an overall configuration of a document creation apparatus according to an embodiment of the present invention. In the present embodiment, a case will be described in which the document creation apparatus is applied to a digital multifunctional peripheral, which is an image forming apparatus.

A digital multifunctional peripheral 1 of the present embodiment includes a function of dividing a double-page spread document for copying the same (hereinafter also referred to as a "division copy mode"). The digital multifunctional peripheral 1 generally includes a reading apparatus (image reading unit) 2 provided with a reading mechanism unit (a CCD unit as an optical sensor, and an auto document feeding device, etc.) for scanning the document and reading image data thereof, a printing apparatus (printing unit) 3 provided with a printing mechanism unit (a paper feed unit, a transport unit, an image formation unit, a transfer unit, a fixing unit and the like) for printing image data read by the reading apparatus 2, a display/operation apparatus 4 provided with a liquid crystal display panel having mounted thereto a touch panel, not shown in the drawings, for receiving various operations from the user, and a control apparatus 5 for controlling these apparatuses 2 to 4.

The control apparatus 5 constitutes a main portion of the document creation apparatus of the present embodiment, and is configured by a control unit 51, an image reading unit 52, an image processing unit 53, a planned division region data extraction unit 54, a reference data generation unit 55, a division determination unit 56, an image division processing unit 57, and an image output unit 58.

The image reading unit 52 stores document image data corresponding to each one page of a double-page spread document that has been read by the reading apparatus 2 in a memory or the like, not shown in the drawings, and transfers the stored document image data to the image processing unit 53.

The image processing unit 53 converts the document image data transferred from the image reading unit 52 into data of a designated resolution, and transfers the resultant data to the image division processing unit 57 and the planned division region data extraction unit 54.

The planned division region data extraction unit 54 extracts data of a planned division region that includes the division position (the position where the document image data is planned to be divided), from the document image data for each of all pages of the double-page spread document, the document image data having been converted to have a designated resolution by the image processing unit 53, and transfers the extracted data to the reference data generation unit 55 and the division determination unit 56.

The reference data generation unit 55 generates reference data for the planned division regions based on the data of the planned division regions for all the pages that has been transferred from the planned division region data extraction unit 54, and transfers generated reference data to the division determination unit 56.

The division determination unit 56 compares the reference data transferred from the reference data generation unit 55 with each of the planned division regions transferred from the planned division region data extraction unit 54. If difference data of the difference therebetween is larger than or equal to a prescribed value (determination threshold) set in advance, then the division determination unit 56 determines that division is impossible, and if the difference data is smaller than the prescribed value, determines that division is possible, and outputs the determination result to the image division processing unit 57.

If the determination result by the division determination unit 56 is that division is impossible, the image division processing unit 57 outputs the document image data transferred from the image processing unit 53 to the image output unit 58 without dividing the document image data, and if the determination result by the division determination unit 56 is that division is possible, the image division processing unit 57 divides the document image data transferred from the image processing unit 53, and outputs the divided document image data to the image output unit 58.

The image output unit 58 converts the document image data transferred from the image division processing unit 57 into image data for printing, and outputs the image data to the printing apparatus 3.

The printing apparatus 3 prints out the transferred print data.

The display/operation apparatus 4 is used when the user gives an instruction for the division copy mode. Also, division results obtained when the division copy mode is performed or the like are displayed by the display/operation apparatus 4.

The control unit 51 includes a CPU, a ROM, a RAM and the like, although they are not shown in the drawings, and controls operations of various units based on the setting information of the division copy mode instructed by the user through the display/operation apparatus 4. Also, a document generation program for executing the division copy mode is stored in the ROM, and when the division copy mode is selected, the CPU sequentially loads the document generation program from the ROM, expands the program in the RAM, sequentially executes the program, thereby performing document creation (namely, division copying).

Example 1 of division copy mode

Figure 2A:
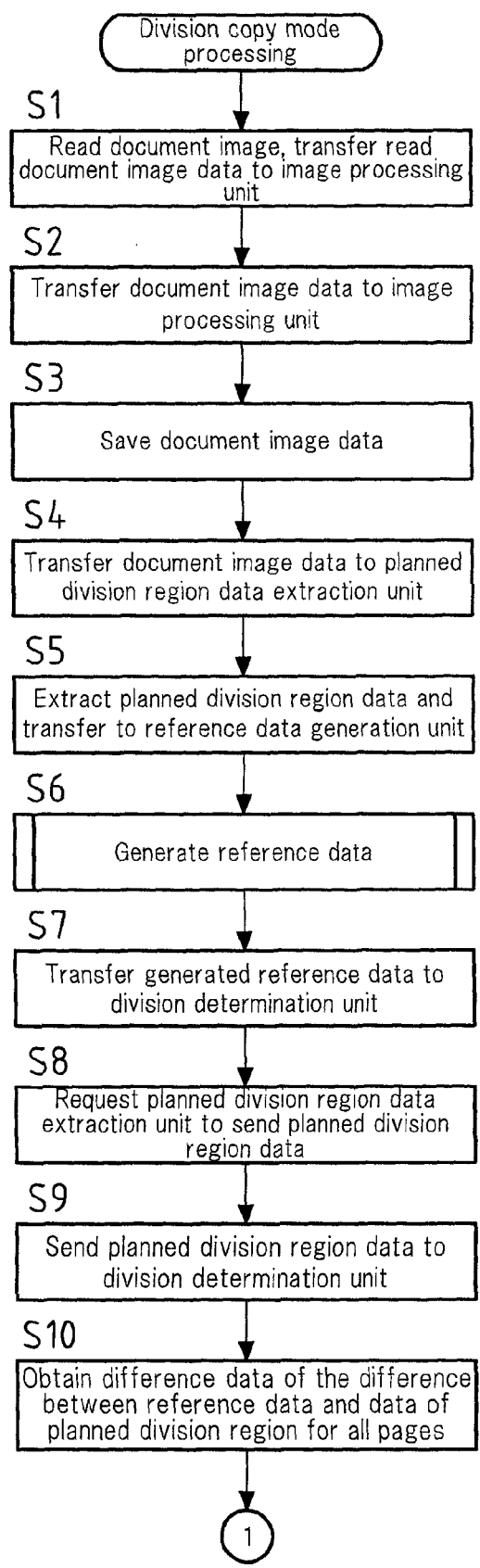
FIG. 2A is a flowchart illustrating Example 1 of a processing operation of a division copy mode.
Figure 2B:
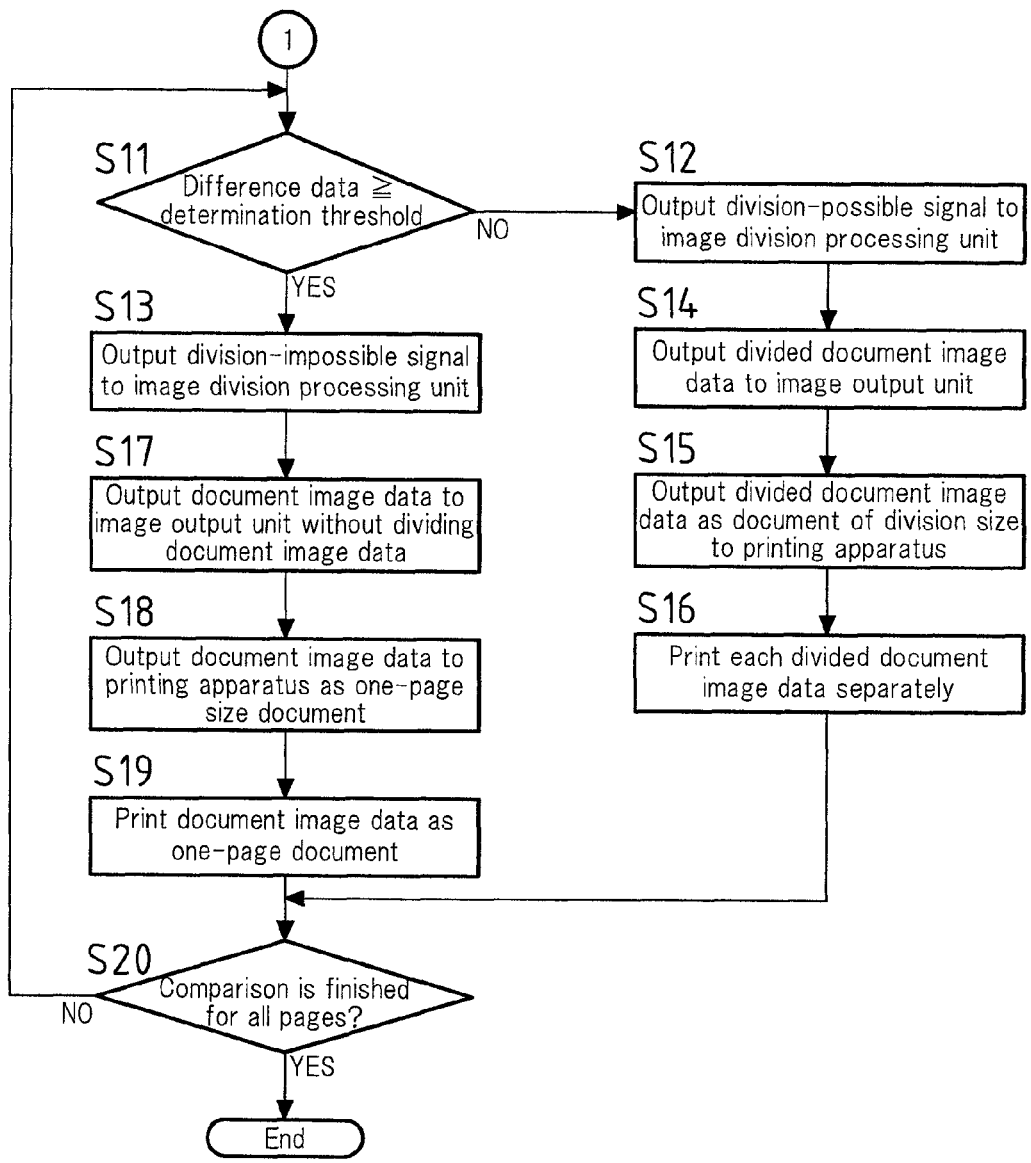
FIG. 2B is a flowchart illustrating Example 1 of the processing operation of the division copy mode.

Next, Example 1 of the processing operation performed when the division copy mode is selected in the digital multifunctional peripheral 1 configured as described above will be described with reference to the flowcharts in FIGS. 2A and 2B, and diagrams illustrating operations in FIGS. 3A to 3D, FIG. 4, FIGS. 5A to 5D, and FIGS. 6A to 6D.

The user places a document that includes both two-page documents for a double-page spread and one-page documents for a double-page spread on the reading apparatus 2, performs settings for the print size, division copying and the like by operating the touch panel of the display/operation apparatus 4, and presses the start key, thereby starting the division copy mode.

Specifically, the reading apparatus 2 starts the operation of reading a plurality of sheets of the document that have been placed, and sequentially transfers document image data of the double-page spreads of the document that has been read to the image reading unit 52 (step S1).

The image reading unit 52 temporarily stores document image data for each one page of the double-page spreads that have been sequentially read by the reading apparatus 2 in a memory or the like, not shown in the drawings, and sequentially transfers the stored document image data for each one page of the double-page spreads to the image processing unit 53 (step S2).

The image processing unit 53 converts the document image data for each one page of the double-page spreads that are sequentially transferred from the image reading unit 52 into data of a designated resolution, and sequentially saves the converted data in an internal temporary storage medium such as an HDD, which is not shown in the drawings (step S3).

Next, the image processing unit 53 sequentially transfers the document image data for each one page of the double-page spreads that is saved in the temporary storage medium, first, to the planned division region data extraction unit 54 (step S4).

The planned division region data extraction unit 54 extracts data of the planned division region including the division position (the division position corresponds to the border line between a plurality of portions into which the document is planned to be divided for copying) from the document image data for each one page of the double-page spreads that has been transferred from the image processing unit 53, and transfers the data of the planned division region to the reference data generation unit 55 (step S5). Also, the planned division region data extraction unit 54 saves the extracted data of the planned division region for the respective pages in an internal memory, not shown in the drawings, until a sending request is received from the division determination unit 56.

Here, a method for extracting the planned division region will be described. The document placed on the reading apparatus 2 can be automatically detected, and thus the planned division region data extraction unit 54 can automatically extract the planned division region. For example, if the size of the document is A3, the division size (the size of each portion when the document is divided into a plurality of portions for copying) is A4, which is half of A3. Accordingly, in this example, the planned division region data extraction unit 54 may extract, as a planned division region, a predetermined region in the division direction extending to both sides of the border line of A4 size portions (the border line between a plurality of portions into which the document is divided for copying). The predetermined region may be set in advance. Also, when the division size is set by the user, the planned division region data extraction unit 54 may extract, as a planned division region, a predetermined region in the division direction extending to both sides of the border line of the set division size portions.

If the length in the division direction of the planned division region is too short, the planned division region includes only the shadow due to the folded portion, so that the accuracy of the determination as to whether division is possible decreases. In contrast, if the length in the division direction of the planned division region is too long, the planned division region includes a large region other than the region near the shadow due to the folded portion, the region near the shadow being suitable for determining whether division is possible, so that the accuracy of the determination as to whether division is possible decreases. Therefore, the length in the division direction of the planned division region is preferably set to be smaller than the size in the division direction of the document, and more preferably, is set in the range from 10% to 20% of the size in the division direction of the document. In addition, the position of the planned division region is preferably set such that the border line between a plurality of portions into which the document is divided for copying runs through the center of the planned division region.

The reference data generation unit 55 generates reference data for the planned division regions based on the data of the planned division regions of all pages that has been transferred from the planned division region data extraction unit 54 (step S6).

Here, processing in step S6, that is, a procedure for generating reference data performed by the reference data generation unit 55 will be described with reference to the diagrams shown in FIGS. 3A to 3D.

The reference data generation unit 55 identifies data of planned division regions showing a similar luminance change in the division direction (scanning direction of the optical sensor) from the data of the planned division regions of all the pages that has been transferred from the planned division region data extraction unit 54, and generates reference data by calculating the average of the identified data of the planned division regions.

Figure 3A:
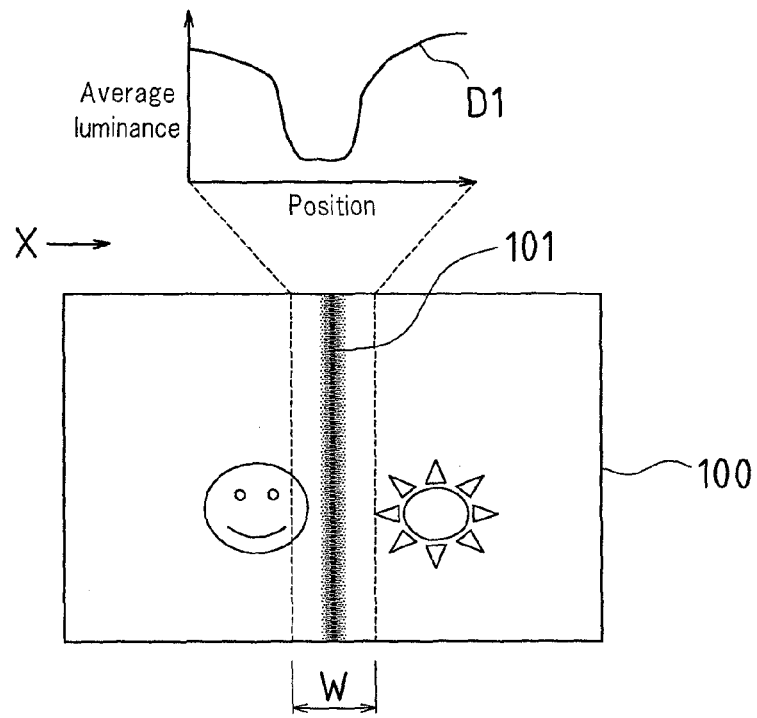
FIG. 3A is a diagram illustrating an example of a two-page document for a double-page spread and projection data obtained by subjecting the planned division region of the double-page spread document to projection processing in the division direction.

For example, when a planned division region W of a double-page spread 100 shown in FIG. 3A is subjected to projection processing in the division direction (scanning direction of the optical sensor) X (this operation corresponds to calculating an average value of luminance of the pixels lined up in the direction orthogonal to the division direction X), projection data D1 that shows a luminance change in the division direction X is obtained. The projection data D1 shows a waveform variation in which, as shown in FIG. 3A, the average luminance value (luminance level) of a folded portion 101 where a shadow appears is lower and the average luminance value (luminance level) on both sides of the folded portion 101 is higher.

The reference data generation unit 55 sequentially obtains projection data sets of the planned division region W of the document image data in this manner, and identifies projection data sets showing a similar waveform variation (namely, luminance change). The reference data generation unit 55 calculates a similarity between projection data sets (e.g., a reciprocal of the difference). Then, the reference data generation unit 55 generates a group of projection data sets having a similarity that is larger than a threshold (e.g., there is no difference) as the candidate data set group. The reference data generation unit 55 generates one or a plurality of candidate data set groups, and when it has generated one candidate data set group, identifies (registers) that candidate data set group as a reference data generation candidate. If the reference data generation unit 55 has generated a plurality of candidate data set groups, it selects, from among the candidate data set groups, the candidate data set group where the overall similarity among projection data sets is the highest, and identifies (registers) that group as the reference data generation candidate. Also, in the case where there are two or more candidate data set groups that have the same similarity among projection data sets (for example, where there is no difference between the projection data sets), that group of the two or more candidate data set groups that has the largest number of constituting projection data sets (for example, the largest number of projection data sets with no difference) is identified (registered) as the reference data generation candidate. Note that also in the case where there are a plurality of pages of one-page document image data for a double-page spread, the possibility is very low that the projection data of the planned division region W of a one-page document image data for a double-page spread is identified (registered) as the reference data generation candidate. This is because, first of all, the similarity among projection data sets of the planned division region W among the pages of the one-page document image data for a double-page spread is small (has a large difference), and the possibility is low that the projection data of the planned division region W of the one-page document image data for a double-page spread is identified as a candidate data set group. Also, the case in which the projection data sets of the planned division region W of a plurality of pages of one-page document image data for a double-page spread are similar to each other (have a high similarity to each other) is limited to the case in which the plurality of one-page documents for the double-page spread are formed by using the same format or the like, which is quite rare. Also in such a case, if the number of the two-page documents for a double-page spread (documents to be divided) is larger than the number of one-page documents for a double-page spread, the projection data of the planned division region W of the two-page document image data for a double-page spread is identified (registered) as the reference data generation candidate, and thus the projection data of the planned division region W of the one-page document image data for a double-page spread is not identified (registered) as the reference data generation candidate.

Figure 3B:
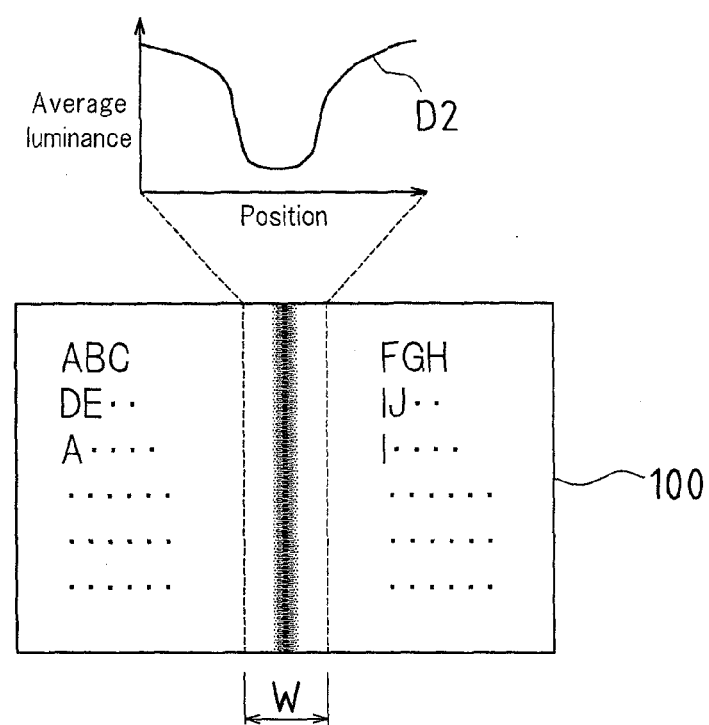
FIG. 3B is a diagram illustrating an example of a two-page document for a double-page spread and projection data obtained by subjecting the planned division region of the double-page spread document to projection processing in the division direction.

For example, in the examples shown in FIGS. 3A and 3B, the projection data D1 and projection data D2 have similar luminance changes in the planned division region W. Thus, the reference data generation unit 55 identifies (registers) these projection data sets D1 and D2 as reference data generation candidates.

Figure 3C:
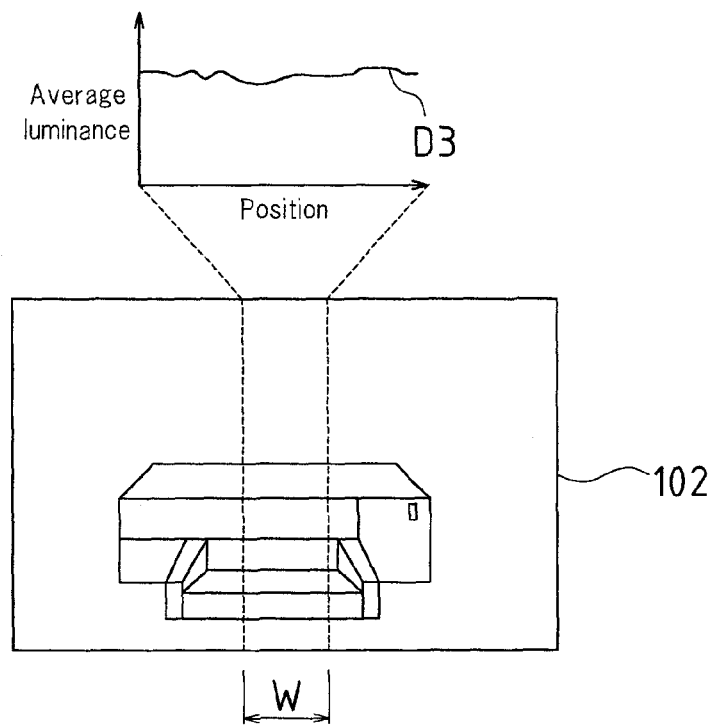
FIG. 3C is a diagram illustrating an example of a one-page document for a double-page spread and projection data obtained by subjecting the planned division region of the double-page spread document to projection processing in the division direction.

On the other hand, in the case of the document image data of a double-page spread 102 as shown in FIG. 3C, the luminance change in the planned division region W of the projection data D3 is clearly different compared with the projection data sets D1 and D2 (the projection data D3 does not have a peak (a bottom, in this case) of the luminance level), and thus the reference data generation unit 55 does not include (does not register) the projection data D3 in the reference data generation candidates.

Note that whether the luminance changes are similar to each other can be determined by numerically converting the projection data sets to two-dimensional vectors, calculating the average of the numerical values of the obtained two-dimensional vectors, and performing comparison by using the obtained average. Note that this determination method is one example for generating reference data. With respect to two-dimensional images, for example, it is possible to generate reference data based on the average value of luminance distribution, calculate the Pearson's correlation coefficient between the reference data and the planned division region of each page, thereby determining the degree of approximation. The method for calculating the Pearson's correlation coefficient for confirming the correlation between two images is a known conventional technology.

Figure 3D:
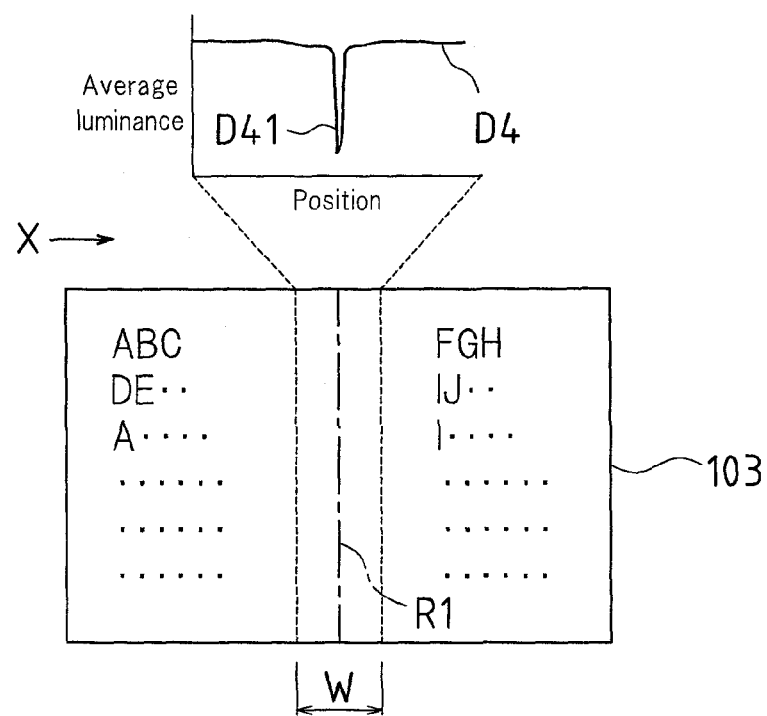
FIG. 3D is a diagram illustrating an example of a two-page document for a double-page spread and projection data obtained by subjecting the planned division region of the double-page spread document to projection processing in the division direction.

Also, as shown in FIG. 3D, in the case where reference data is generated from the document image data of a document 103 in which a clear division reference line R1 is present in the planned division region W, the luminance change has a clear bottom value D41 as shown in projection data D4. Accordingly, by calculating an average after correcting the positions of the projection data sets as the generation candidate in the division direction X such that the positions of the bottom value D41 are aligned, it is possible to generate reference data that has a larger correlation. That is, the reference data generation unit 55 may generate reference data by calculating an average of the projection data sets after correcting the projection data sets (shifting the projection data sets in the division direction) such that the peak positions (bottom positions) of the projection data sets match each other.

Figure 4:
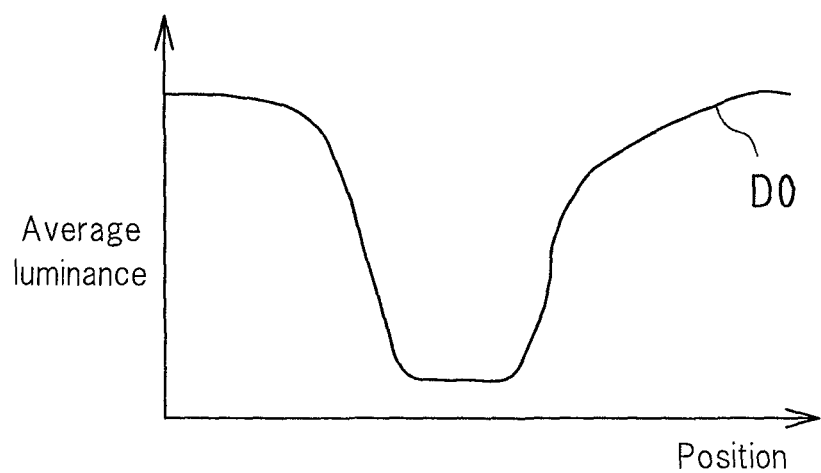
FIG. 4 is a diagram illustrating an example of generated reference data.

FIG. 4 shows an example of reference data DO generated as described above. Note that the reference data DO shown in FIG. 4 shows an example of reference data generated based on the projection data sets shown in FIGS. 3A and 3B, or the like.

The reference data DO generated in this manner is transferred to the division determination unit 56 (step S7).

When the division determination unit 56 has received the reference data D0 generated in the reference data generation unit 55, it requests the planned division region data extraction unit 54 to send data of the planned division region for each page (step S8).

In response to this request for sending data, the planned division region data extraction unit 54 sequentially sends the planned division region data for each page that is stored in the internal memory to the division determination unit 56 (step S9).

The division determination unit 56 sequentially calculates the difference (namely, the difference data) between the reference data D0 and the data of the planned division regions of the document image data for all pages that has been sent from the planned division region data extraction unit 54 (step S10), and sequentially compares the difference data with a preset determination threshold (determination processing) (step S11).

As a result, if the difference data is smaller than the determination threshold ("No" in step S11), the document image data as the comparison target and the reference data D0 are correlated, and thus the division determination unit 56 determines that the document image data as the comparison target can be divided (that is, determines that the document image data is data of the two-page document for a double-page spread), and outputs a division-possible signal to the image division processing unit 57 as a division determination signal (step S12).

In contrast, if as a result of the comparison between the difference data and the determination threshold in step S11, the difference data is larger than or equal to the determination threshold (Yes in step S11), the document image data as the comparison target and the reference data D0 are not correlated, and thus the division determination unit 56 determines that the document image data as the comparison target cannot be divided (that is, determines that the document image data is data of the one-page document for a double-page spread), and outputs a division-impossible signal to the image division processing unit 57 as a division determination signal (step S13).

Figure 5A:
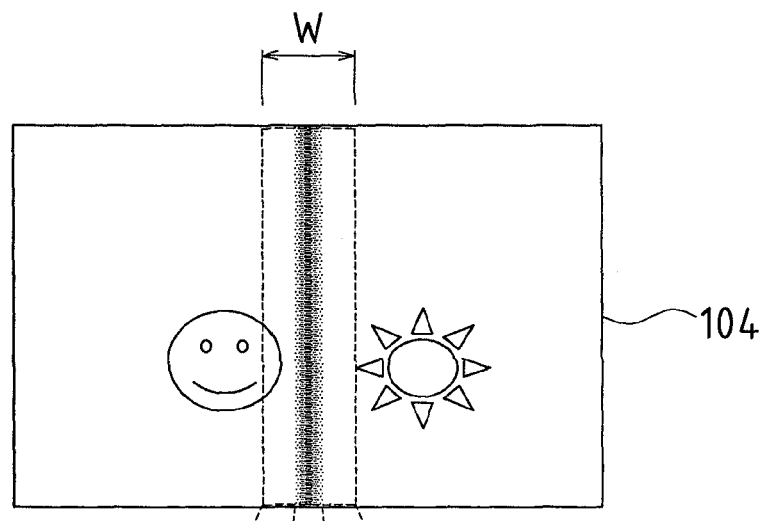
FIG. 5A is a diagram illustrating an example of document image data of a two-page document for a double-page spread that is stored in a temporary storage medium of an image processing unit.
Figure 5B:
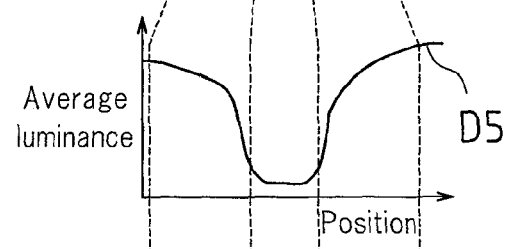
FIG. 5B is a diagram illustrating an example of projection data showing a luminance change.

For example, in the case where the document image data stored in the temporary storage medium of the image processing unit 53 is the document image data of a document 104 that is the two-page document for a double-page spread shown in FIG. 5A, the projection data of the planned division region W extracted from this document image data by the planned division region data extraction unit 54 is the projection data D5 showing the luminance change as shown in FIG. 5B. The difference data D5' between the projection data D5 and the reference data D0 shown in FIG. 5C has a waveform whose level varies as shown in FIG. 5D, and is smaller than a preset determination threshold Ls (that is, the difference between the data D5 and the data D0 is small, in other words, the matching degree between the data D5 and the data D0 is high). That is, the average value of the difference data D5' (the average at all positions in the planned division region W) is smaller than the preset determination threshold Ls. In the case where the average value of the difference data is smaller than the determination threshold, the division determination unit 56 determines that the document image data serving as the comparison target can be divided, and outputs the division-possible signal to the image division processing unit 57 as the division determination signal.

Figure 6A:
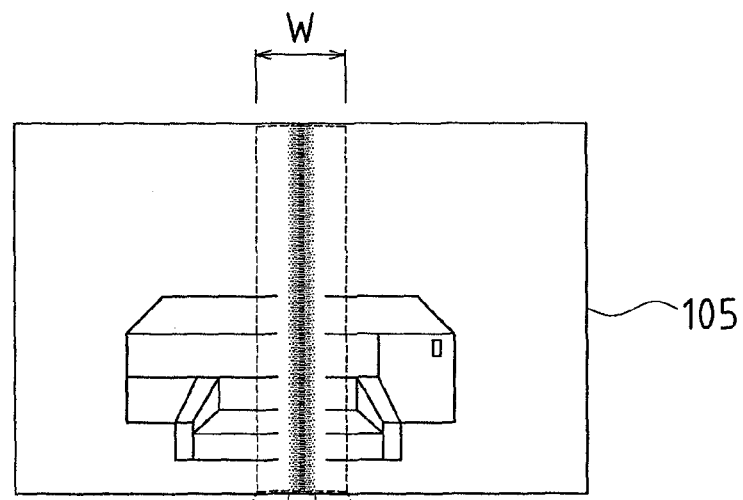
FIG. 6A is a diagram illustrating an example of document image data of a one-page document for a double-page spread that is stored in the temporary storage medium of the image processing unit.
Figure 6B:
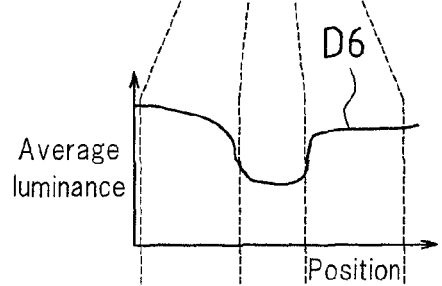
FIG. 6B is a diagram illustrating an example of the projection data showing a luminance change.

In contrast in the case where the document image data that is stored in the temporary storage medium of the image processing unit 53 is the document image data of a document 105 that is the one-page document for a double-page spread as shown in FIG. 6A, for example, the projection data of the planned division region W extracted from this document image data by the planned division region data extraction unit 54 is the projection data D6 showing the luminance change as shown in FIG. 6B. The difference data D6' of the difference between the projection data D6 and the reference data D0 shown in FIG. 6C has a waveform whose level varies as shown in FIG. 6D, and exceeds a preset determination threshold Ls (that is, the difference between the data D6 and the data D0 is large, in other words, the matching degree between the data D6 and the data D0 is low). Specifically, the difference data D6' has a portion where its value exceeds the preset determination threshold Ls. This means that a region other than the shadow due to the folded portion in the planned division region W of the document includes a significant image. Therefore, this document image data should be determined to be document image data of a one-page document for a double-page spread. On the other hand, since the two-page document for a double-page spread that actually should be divided does not include a significant image in a region other than the shadow due to the folded portion, the difference data of the document image data of the two-page document for a double-page spread is smaller than the preset determination threshold Ls at any position in the planned division region W. In the case where the difference data has a portion where its level exceeds the preset determination threshold Ls as shown in this example, the division determination unit 56 determines that the document image data serving as the comparison target cannot be divided, and outputs the division-impossible signal to the image division processing unit 57 as the division determination signal.

Figure 5C:
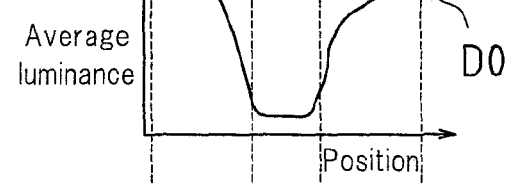
FIG. 5C is a diagram illustrating an example of the reference data.
Figure 5D:
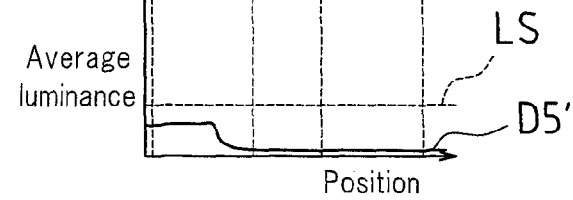
FIG. 5D is a diagram illustrating an example of difference data of the difference between the projection data and the reference data.
Figure 6C:
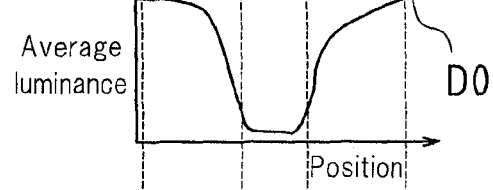
FIG. 6C is a diagram illustrating an example of the reference data.
Figure 6D:
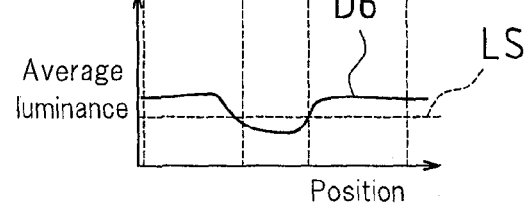
FIG. 6D is a diagram illustrating an example of the difference data of the difference between the projection data and the reference data.

Specifically, in the case where the document image data stored in the temporary storage medium of the image processing unit 53 is the document image data of the document 104, which is a two-page document for a double-page spread shown in FIG. 5A, the division determination unit 56, through the division determination processing with a comparison as illustrated in FIGS. 5B, 5C, and FIG. 5D, outputs a division-possible signal to the image division processing unit 57, and in the case where the document image data stored in the temporary storage medium of the image processing unit 53 is the document image data of the document 105, which is a one-page document for a double-page spread shown in FIG. 6A, through the division determination processing with a comparison as illustrated in FIGS. 6B, 6C, and 6D, outputs a division-impossible signal to the image division processing unit 57.

The division-possible signals and division-impossible signals sent from the division determination unit 56 and received by the image division processing unit 57 are sent in the order in which the documents placed on the reading apparatus 2 are read. The document image data input from the temporary storage medium of the image processing unit 53 to the image division processing unit 57 is also sent in the order in which the documents placed on the reading apparatus 2 are read. That is, the image division processing unit 57 can receive the document image data received from the image processing unit 53 and the division determination signal (division-possible signal or the division-impossible signal) received from the division determination unit 56 in synchronization.

Accordingly, if the division determination signal received from the division determination unit 56 is a division-possible signal with respect to the document image data received from the image processing unit 53 ("No" in step S11), the image division processing unit 57 advances the processing to step S12 and then to step S14, divides the document image data of A3 size, for example, received from the image processing unit 53 into two, and sequentially outputs the divided document image data to the image output unit 58 (step S14). The image output unit 58 sequentially converts the divided document image data that has been received into image data for printing, and sequentially outputs the converted data as A4 document data to the printing apparatus 3 (step S15). The printing apparatus 3 sequentially prints the divided document image data that has been received on recording sheets of A4 size for output (step S16). Specifically, in this case, the document image data of the double-page spread document 104 shown in FIG. 5A is divided into right-side document image data and left-side document image data, which are separately printed out on A4 recording sheets.

In contrast, if the division determination signal received from the division determination unit 56 is a division-impossible signal with respect to the document image data received from the image processing unit 53 (Yes in step S11), the image division processing unit 57 advances processing to step S13 and then to step S17, and outputs the document image data of A3 size, for example, received from the image processing unit 53 to the image output unit 58 without dividing the document image data (step S17). The image output unit 58 converts the received document image data into image data for printing, and outputs it as A3 document data to the printing apparatus 3 (step S18). The printing apparatus 3 prints out the received document image data on an A3 recording sheet (step S19). Specifically, in this case, the document image data of the document 105, which is a one-page document for a double-page spread shown in FIG. 6A, is printed out on a A3 recording sheet as one-page document image data without dividing.

The division determination unit 56, the image division processing unit 57 and the image output unit 58 repeat the processing of the steps S11 to S19 for all pages of the document read by the reading apparatus 2, and when division printing processing is finished for all pages (Yes in step S20), the division copy mode ends.

This completes description of Example 1 of the division copy mode.

Example 2 of division copy mode

Figure 7:
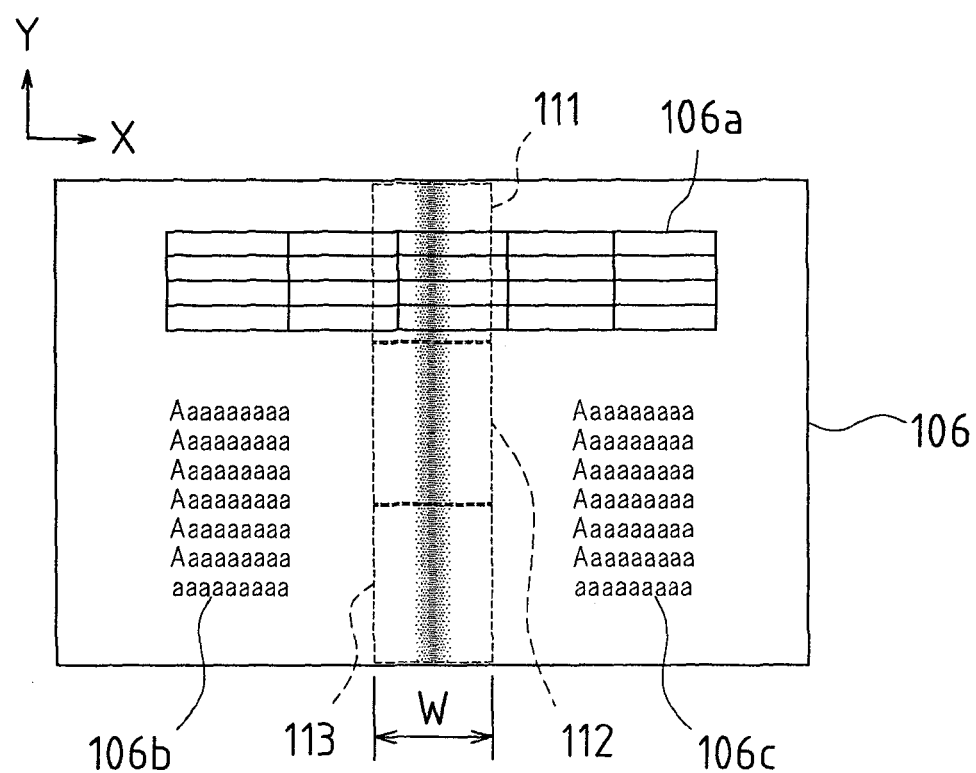
FIG. 7 is a diagram illustrating another example of the one-page document for a double-page spread.

In the case where an image of a one-page document for a double-page spread is printed on a double-page spread document, depending on the type, size, form, print position or the like of the image, an erroneous determination may occur if the determination as to whether division is possible is based on only one region in the division direction. For example, in the case of a one-page document 106 for a double-page spread as shown in FIG. 7, a table 106a formed by thin lines and straddling the right and left pages is printed in an upper portion of the one-page document 106, and in the central and lower portions thereof, descriptions 106b and 106c or the like of the table 106a are separately printed on the right and left pages. A one-page document 106 for a double-page spread having such an image construction should actually be determined to be a one-page document in order to determine more precisely whether the division is possible. When this double-page spread document 106 is scanned in the division direction (scanning direction) X in the central portion in a longitudinal direction (Y) of the document, for example, the table 106a of the upper portion is not present on the scanning lines, and therefore the document is determined to be a two-page document for a double-page spread, which can be divided.

In view of this, in the present embodiment, as Example 2 of the division copy mode, a determination through comparison between the reference data and the data of each planned division region is performed for at least two regions within each planned division region of the document image data, thereby achieving a configuration for determining more precisely whether division is possible.

Specifically, in Example 2, as shown in FIG. 7, the planned division region W of the document image data is segmented in a direction orthogonal to the division direction (hereinafter referred to as a longitudinal direction) Y, thereby dividing the planned division region W into three partitions 111 to 113 arranged in the orthogonal direction (hereinafter referred to as "longitudinal direction partitions").

Specifically, in the example shown in FIG. 7, a first longitudinal direction partition 111 includes the table 106a, and a second longitudinal direction partition 112 and a third longitudinal direction partition 113 do not include a print image.

The configuration of the function block diagram of the digital multifunctional peripheral 1 of this Example 2 is the same as that shown in FIG. 1. Example 2 is different from Example 1 in the determination processing operation performed by the division determination unit 56, and thus only the determination processing operation performed by the division determination unit 56 (that is, the processing operation in steps S10 and S11 in the flowchart of FIG. 2) will be described.

Figure 8:
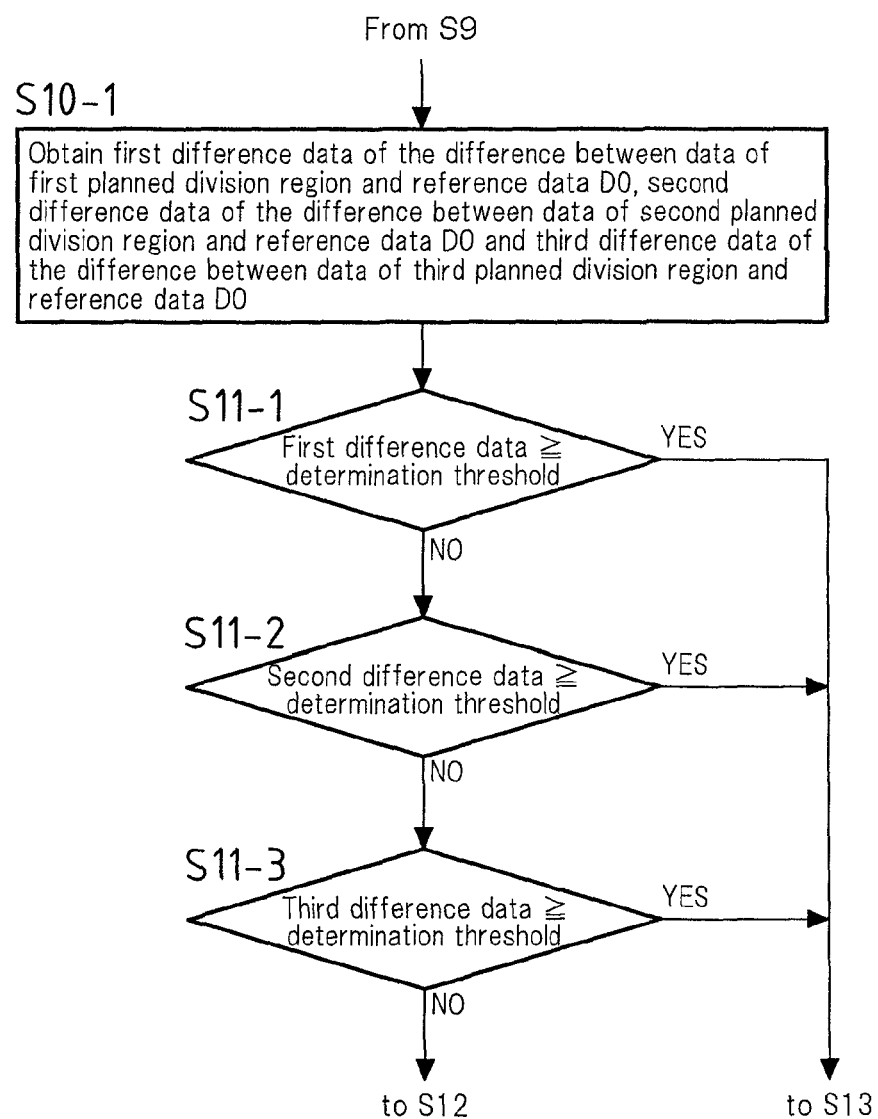
FIG. 8 is a flowchart illustrating a determination processing operation performed by a division determination unit, according to Example 2.

FIG. 8 is a flowchart illustrating only the portion corresponding to the determination processing operation of Example 2 performed by the division determination unit 56.

That is, the division determination unit 56 sequentially determines difference data of the difference between the reference data D0 and the data of the planned division regions of the document image data for all pages that have been sent from the planned division region data extraction unit 54, and at this time, for each page, the data of each planned division region is divided into first planned division region data corresponding to the first longitudinal direction partition 111, second planned division region data corresponding to the second longitudinal direction partition 112, and third planned division region data corresponding to the third longitudinal direction partition 113. Then, the difference data (first difference data) of the difference between the first planned division region data and the reference data D0, the difference data (second difference data) of the difference between the second planned division region data and the reference data D0, and difference data (third difference data) of the difference between the third planned division region data and the reference data D0 are determined (step S10-1).

Next, the division determination unit 56 compares the first difference data with the determination threshold Ls with respect to a single document for a double-page spread document (step S11-1). As a result, if the first difference data is smaller than the determination threshold ("No" in step S11-1), next, the second difference data is compared with the determination threshold Ls (step S11-2). As a result, if the second difference data is smaller than the determination threshold ("No" in step S11-2), then, the third difference data is compared with the determination threshold Ls (step S11-3). As a result, if the third difference data is smaller than the determination threshold ("No" in step S11-3), the two pages of data are correlated, and thus the document image data serving as the comparison target is determined to be dividable (that is, determined to be a two-page document for a double-page spread), and the division-possible signal is output to the image division processing unit 57 as the division determination signal (step S12).

On the other hand, if any one of the determinations made in the above-described steps S11-1 to S11-3 is YES, the two pages of data are not correlated, and thus the document image data serving as the comparison target is determined to be not dividable (that is, determined to be a one-page document for a double-page spread), and a division-impossible signal is output to the image division processing unit 57 as the division determination signal (step S13).

In the case where the above-described determination processing is applied to the one-page document 106 for a double-page spread shown in FIG. 7, the determination result in step S11-1 is YES, and the processing advances to step S13.

That is, by performing the determination processing of Example 2, it is possible to precisely determine that the one-page document 106 for a double-page spread shown in FIG. 7 is a one-page document for a double-page spread.

Example 3 of division copy mode

Note that Example 2 does not particularly refer to the generation of reference data. In other words, the generation of reference data of Example 2 has been described to be the same as that of Example 1. In short, Example 2 is configured to generate one type of reference data from the document image data for all pages.

However, in order to perform the division determination more precisely, also with respect to the reference data, first reference data D01 corresponding to the first longitudinal direction partition 111, second reference data D02 corresponding to the second longitudinal direction partition 112, and third reference data D03 corresponding to the third longitudinal direction partition 113 may be generated, and in step S10-1, difference data (first difference data) of the difference between the first planned division region data and the first reference data D01, difference data (second difference data) of the difference between the second planned division region data and the second reference data D02, difference data (third difference data) of the difference between the third planned division region data and the third reference data D03 may be obtained. In this manner, the determination processing in the following steps S11-1 to S11-3 can be performed more precisely and without an erroneous determination.

Other examples of division copy mode

As described above with reference to FIG. 3D, in the case where reference data is generated from the document image data of the document 103 in which the clear division reference line R1 is present in the planned division region W, the generated reference data has a data waveform in which the luminance change has a clear bottom value, similar to the projection data D4. Accordingly, by correcting the position where the bottom value appears, it becomes possible to perform division copying at a more consistent position (at the actual division positions).

Figure 9A:
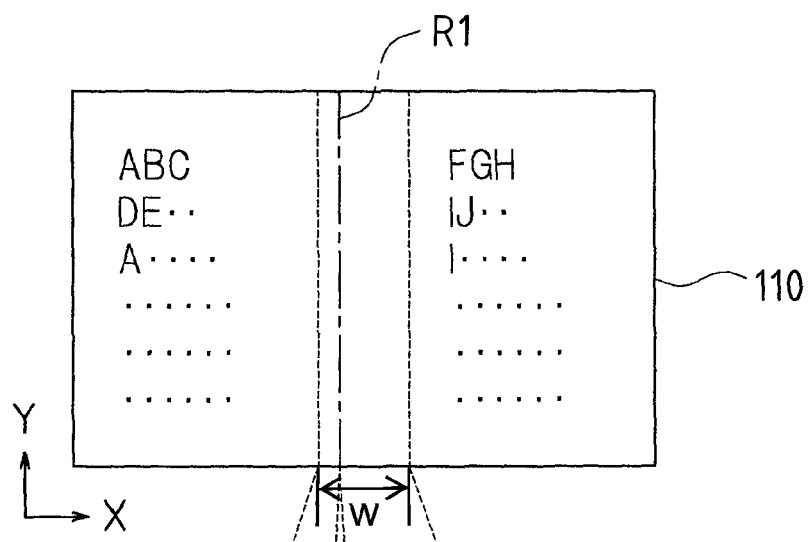
FIG. 9A is a diagram illustrating an example of document image data of a two-page document for a double-page spread that is stored in the temporary storage medium of the image processing unit.
Figure 9B:
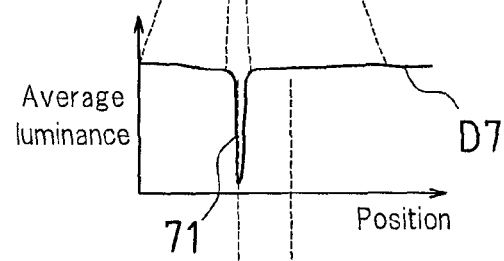
FIG. 9B is a diagram illustrating an example of the projection data showing a luminance change.
Figure 9C:
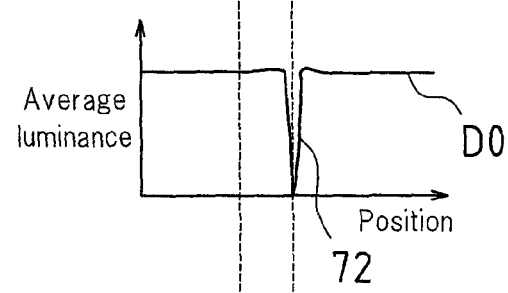
FIG. 9C is a diagram illustrating an example of the reference data.
Figure 9D:
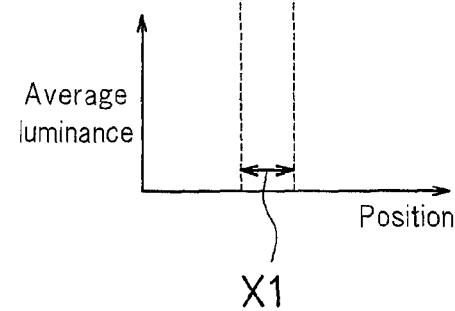
FIG. 9D is a diagram illustrating an example of the difference data of the difference between the projection data and the reference data.
Figure 10A:
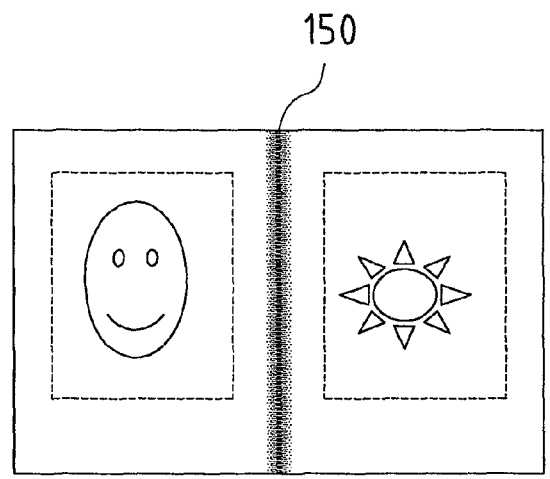
Figure 10B:
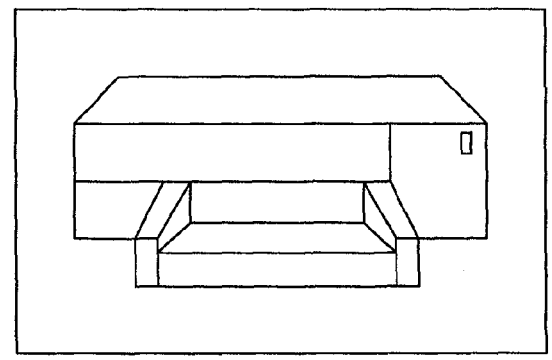
FIG. 10B is a conceptual diagram of a one-page document.
Figure 10C:
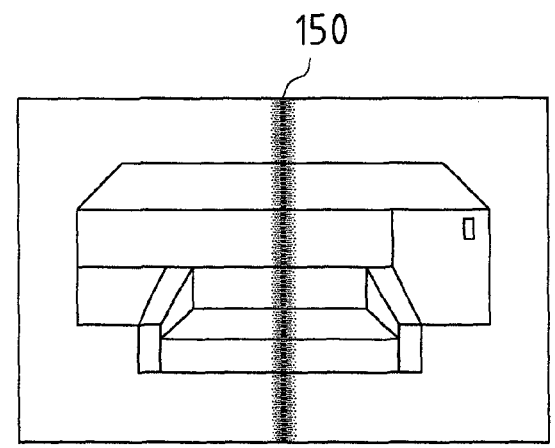
FIG. 10C is a conceptual diagram of a one-page document, in which a shadow is printed in the central portion thereof.

For example, as shown in FIG. 9A, when a clear division reference line R1 is present in the planned division region W of the document read by the reading apparatus 2, in the case of a document 110 in which the division reference line R1 of the document is shifted from the center (the central portion in the division direction), the projection data of the planned division region W extracted from the document image data by the planned division region data extraction unit 54 is projection data D7 having a luminance change as shown in FIG. 9B, and when the projection data D7 is compared with reference data D0 shown in FIG. 9C, it is understood that a bottom position 71 of the projection data D7 is shifted from a bottom position 72 of the reference data D0 in the division direction X by the amount X1. Accordingly, after correcting the reference data D0 (shifting the reference data D0 in the left direction by the amount X1) such that the positions of the peaks (bottom positions 71 and 72) of the data D7 and the data D0 match, the division determination unit 56 obtains difference data by comparing the corrected reference data D0 with the projection data D7 (obtaining the difference). In this manner, with respect to the difference data as well, it is possible to obtain more precise difference data in which the shift amount of the projection data has been corrected.

Also, the division determination unit 56 outputs the shift amount (leftward shift by the amount X1) to the image division processing unit 57 together with the division determination signal.

When division printing of the document image data of the document shown in FIG. 9A is performed, the image division processing unit 57 takes the shift amount into account, and divides the data at the position (division reference line R1) obtained by shifting the division position of the document image data by the shift amount X1. As a result, it is possible to print divided document image data obtained by dividing the data precisely at the actual division position.

Note that the present invention can be implemented by a computer-readable recording medium in which a program executed by a computer is recorded, the program being a document creation program for causing processing operations of the above-described division copy modes, namely, each step of the document creation method, to be executed.

As the recording medium, since the processing is executed by a computer, a memory, not shown in the drawings, such as a ROM may serve as a program medium, or the program medium may be a medium that can be read as a result of being inserted into a program reading device that is provided as an external storage device, although not shown. In any case, stored program code may be configured to be executed as a result of being accessed by a microprocessor. Alternatively, in any case, the program code may be read out, and the read-out program code may be downloaded to a program storage area, not shown in the drawings, of the microcomputer, and executed. This program for downloading is stored in advance in the apparatus main body.

Here, the program medium is a recording medium configured to be separable from the main body, and may be a tape, such as a magnetic tape, cassette tape and the like, a disk, for example a magnetic disk, such as a floppy (registered trademark) disk or a hard disk, or an optical disk, such as a CD-ROM, MO, MD, DVD and the like, a card, such as an IC card (including a memory card), an optical card and the like, or a medium that fixedly carries program code, including semiconductor memories such as a mask ROM, an EEPROM Erasable Programmable Read Only Memory), an EEPROM (Electrically Erasable Programmable Read Only Memory), a flash ROM.

Also, in the case of a system configuration capable of connecting to a communication network including the Internet, a medium may be used that dynamically carries program code so as to download the program code from the communication network. Note that when program code is downloaded from the communication network in this manner, the program for downloading may be stored in advance in the apparatus main body, or may be installed from a separate recording medium.

Note that in the foregoing embodiments, reference data generation processing in the reference data generation unit 55, determination processing in the division determination unit 56 and division processing in the image division processing unit 57 are configured to be performed in series with a single reading operation of the double-page spread document, but the invention is not limited to the processing being performed in series. For example, the configuration may be such that each processing is performed separately, for example, all pages of the double-page spread document are read once, and first, the reference data generation unit 55 executes reference data generation processing, and thereafter, all pages of the same double-page spread document are read again, and then the determination processing in the division determination unit 56 and the division processing in the image division processing unit 57 are executed.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A document creation apparatus having a function of dividing a double-page spread document at a folded portion thereof and copying the divided double-page spread document, the apparatus comprising:
an image reading unit that reads the double-page spread document and generates document image data respectively for all pages of the double-page spread document;
a printing unit that prints the document image data;
an extraction unit that extracts luminance data of a planned division region from the document image data for each of the pages generated by the image reading unit, the planned division region being a predetermined region in a division direction extending to both sides of a border line between a plurality of portions, the border line being where the document image data is divided into the plurality of portions;
a generation unit that obtains projection data that shows respective luminance changes in the division direction of the planned division regions of all the pages by calculating an average value of luminance of pixels lined up in a direction orthogonal to the division direction in the luminance data of the planned division regions of all the pages extracted by the extraction unit, and that generates reference projection data for the planned division regions based on the obtained projection data of the planned division regions of all the pages;
a division determination unit that compares the reference projection data with the projection data of each planned division region, and if difference projection data of a difference between the reference projection data and the projection data of that planned division region is larger than or equal to a preset determination threshold, determines that division at the folded portion is impossible, and if the difference projection data is smaller than the preset determination threshold, determines that division at the folded portion is possible; and
an image division processing unit that, if a result of the determination by the division determination unit is that division at the folded portion is impossible, prints the document image data with the printing unit without dividing the document image data, and if the result of the determination by the division determination unit is that division at the folded portion is possible, divides the document image data at the folded portion and prints the divided document image data with the printing unit.

2. The document creation apparatus according to claim 1, wherein the generation unit, among the projection data of the planned division regions of all the pages, identifies projection data of planned division regions that show a similar luminance change in the division direction, and generates the reference projection data by calculating an average of the identified projection data of the planned division regions.

3. The document creation apparatus according to claim 1, wherein the division determination unit performs the determination by comparing the reference projection data and the projection data of each planned division region for at least two regions within each planned division region of the document image data.

4. The document creation apparatus according to claim 3, wherein the at least two regions are at least two orthogonal direction partitions obtained by partitioning each planned division region of the document image data in a direction orthogonal to a division direction.

5. The document creation apparatus according to claim 4, wherein the generation unit generates the reference projection data for each of the orthogonal direction partitions, and
the division determination unit compares the reference projection data with the projection data of each planned division region for each orthogonal direction partition, and if the difference projection data of a difference between the reference projection data and the projection data of the planned division region is larger than or equal to the preset determination threshold for at least one of the orthogonal direction partitions, determines that division at the folded portion is impossible.

6. The document creation apparatus according to claim 1, wherein if the division determination unit has determined, as a result of the comparison between the reference projection data and the projection data of the planned division region, that the difference projection data of the difference between the reference projection data and the projection data of the planned division region is smaller than the determination threshold, then the division determination unit obtains a shift amount in the division direction between the reference projection data and the projection data of the planned division region, and
the image division processing unit corrects the division position based on the shift amount obtained by the division determination unit, and divides the document image data.

7. The document creation apparatus according to claim 6, wherein the image division processing unit corrects the division position of the document image data based on the shift amount obtained by the division determination unit such that a peak value of the reference projection data matches a peak value of the projection data of each planned division region.

8. The document creation apparatus according to claim 7, wherein the image division processing unit corrects the division position of the document image data such that a peak value of a luminance change in the division direction of the reference projection data matches a peak value of the luminance change in the division direction of the projection data of each planned division region.

9. The document creation apparatus according to claim 1, wherein the generation unit, after correcting the projection data of the planned division regions of all the pages such that peak values of the luminance changes in the division direction of the projection data of the planned division regions match each other, generates the reference projection data for the planned division regions based on the corrected projection data of the planned division regions of all the pages.

10. The document creation apparatus according to claim 1, wherein the division determination unit, after correcting the reference projection data such that a peak value of the luminance change in the division direction of the reference projection data matches a peak value of the luminance change in the division direction of the projection data of each planned division region, compares the reference projection data with the projection data of each planned division region.

11. The document creation apparatus according to claim 1, wherein the generation unit, with respect to the projection data of the planned division regions of all the pages extracted by the extraction unit, calculates a similarity of the luminance change in the division direction, identifies projection data of planned division regions having a similarity larger than a preset threshold, and generates the reference projection data by calculating an average of the identified projection data of the planned division regions.

12. A document creation method executed in a document creation apparatus that divides a double-page spread document at a folded portion thereof and copies the divided double-page spread document, the method comprising the steps of:
   reading the double-page spread document and generating document image data respectively for all pages of the double-page spread document;
   extracting luminance data of a planned division region from the document image data for each of the pages generated in the reading and generating step, the planned division region being a predetermined region in a division direction extending to both sides of a border line between a plurality of portions, the border line being where the document image data is divided into the plurality of portions;
   obtaining projection data that shows respective luminance changes in the division direction of the planned division regions of all the pages by calculating an average value of luminance of pixels lined up in a direction orthogonal to the division direction in the luminance data of the planned division regions of all the pages extracted in the extracting step, identifying projection data of the planned division regions that show a similar luminance change in the division direction among the obtained projection data of the planned division regions of all the pages, and generating reference projection data by calculating an average of the identified projection data of the planned division regions;
   comparing the reference projection data with the projection data of each planned division region, and if difference projection data of a difference between the reference projection data and the projection data of that planned division region is larger than or equal to a preset determination threshold, determining that division at the folded portion is impossible, and if the difference projection data is smaller than the preset determination threshold, determining that division at the folded portion is possible; and
   if a result of the determination in the comparing and determining step is that division at the folded portion is impossible, printing the document image data with a printing unit without dividing the document image data, and if the result of the determination in the comparing and determining step is that division at the folded portion is possible, dividing the document image data at the folded portion and printing the divided document image data with the printing unit.

13. A non-transitory computer-readable recording medium in which a document generation program is recorded, the document generation program being executed in a document creation apparatus that divides a double-page spread document at a folded portion thereof and copies the divided double-page spread document, and causing a computer to execute the steps of:
   reading the double-page spread document and generating document image data respectively for all pages of the double-page spread document;
   extracting luminance data of a planned division region from the document image data for each of the pages generated in the reading and generating step, the planned division region being a predetermined region in a division direction extending to both sides of a border line between a plurality of portions, the border line being where the document image data is divided into the plurality of portions;
   obtaining projection data that shows respective luminance changes in the division direction of the planned division regions of all the pages by calculating an average value of luminance of pixels lined up in a direction orthogonal to the division direction in the luminance data of the planned division regions of all the pages extracted in the extracting step, identifying projection data of the planned division regions that show a similar luminance change in the division direction among the obtained projection data of the planned division regions of all the pages, and generating reference projection data by calculating an average of the identified projection data of the planned division regions;
   comparing the reference projection data with the projection data of each planned division region, and if difference projection data of a difference between the reference projection data and the projection data of that planned division region is larger than or equal to a preset determination threshold, determining that division at the folded portion is impossible, and if the difference projection data is smaller than the preset determination threshold, determining that division at the folded portion is possible; and
   if a result of the determination in the comparing and determining step is that division at the folded portion is impossible, printing the document image data with a printing unit without dividing the document image data, and if the result of the determination in the comparing and determining step is that division at the folded portion is possible, dividing the document image data at the folded portion and printing the divided document image data with the printing unit.

* * * * *